(12) United States Patent
Hamid et al.

(10) Patent No.: US 8,296,570 B2
(45) Date of Patent: Oct. 23, 2012

(54) FLEXIBLE METHOD OF USER AUTHENTICATION

(75) Inventors: Laurence Hamid, Ottawa (CA); Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 1454 days.

(21) Appl. No.: 11/508,463

(22) Filed: Aug. 23, 2006

(65) Prior Publication Data

US 2006/0288229 A1   Dec. 21, 2006

Related U.S. Application Data

(63) Continuation of application No. 09/625,548, filed on Jul. 25, 2000, now Pat. No. 7,137,008.

(51) Int. Cl.
*G06F 21/00* (2006.01)
(52) U.S. Cl. ........ 713/182; 713/165; 713/166; 713/167; 713/185; 713/186; 726/9; 726/16; 726/17; 726/20
(58) Field of Classification Search .......... 713/165–167, 713/182–186, 193; 380/286; 726/5, 6, 9, 726/16–20
See application file for complete search history.

(56) References Cited

U.S. PATENT DOCUMENTS

| | | | |
|---|---|---|---|
| 4,353,056 A | 10/1982 | Tsikos | |
| 4,596,898 A | 6/1986 | Pemmaraju | |
| 5,109,427 A | 4/1992 | Yang | |
| 5,187,482 A | 2/1993 | Tiemann et al. | |
| 5,187,748 A | 2/1993 | Lee | |
| 5,229,764 A | 7/1993 | Matchett et al. | 340/5.52 |
| 5,233,404 A | 8/1993 | Lougheed et al. | |
| 5,677,953 A * | 10/1997 | Dolphin | 705/51 |
| 5,734,718 A * | 3/1998 | Prafullchandra | 713/183 |
| 5,818,936 A | 10/1998 | Mashayekhi | |
| 5,841,970 A | 11/1998 | Tabuki | |
| 5,877,483 A | 3/1999 | Bilich et al. | |
| 5,970,143 A * | 10/1999 | Schneier et al. | 713/181 |
| 5,978,919 A | 11/1999 | Doi et al. | |
| 5,995,630 A | 11/1999 | Borza | |
| 6,002,748 A | 12/1999 | Leichner | |
| 6,016,476 A | 1/2000 | Maes et al. | |
| 6,044,465 A | 3/2000 | Dutcher et al. | |
| 6,074,434 A * | 6/2000 | Cole et al. | 717/173 |

(Continued)

FOREIGN PATENT DOCUMENTS

EP   1 050 790   11/2000

(Continued)

OTHER PUBLICATIONS

Xiao Qinghan and Bian Zhaoqi, "An approach to Fingerprint Identification by Using the Attributes of Feature Lines of Fingerprint" IEEE Pattern Recognition, pp. 663, 1986.

(Continued)

*Primary Examiner* — Justin T Darrow

(57) ABSTRACT

A method of authorizing a user in communication with a workstation is disclosed. According to the method, a system automatically determines a plurality of available user information entry devices in communication with the workstation. The system then determines predetermined user authorization methods each requiring data only from available user information entry devices. The user then selects one of the determined authorization methods for use in user authorization. Optionally, each authorization method is associated with a security level relating to user access to resources. Once the authorization method is selected, the user provides user authorization information in accordance with a determined user authorization method and registration proceeds.

24 Claims, 7 Drawing Sheets

U.S. PATENT DOCUMENTS

| | | | |
|---|---|---|---|
| 6,088,805 | A | 7/2000 | Davis et al. |
| 6,160,903 | A | 12/2000 | Hamid et al. |
| 6,167,517 | A | 12/2000 | Gilchrist et al. |
| 6,193,153 | B1 | 2/2001 | Lambert ................. 235/380 |
| 6,202,158 | B1 | 3/2001 | Urano et al. |
| 6,256,737 | B1 | 7/2001 | Bianco et al. |
| 6,275,825 | B1 | 8/2001 | Kobayashi et al. |
| 6,308,273 | B1 | 10/2001 | Goertzel et al. |
| 6,389,542 | B1 | 5/2002 | Flyntz ....................... 726/17 |
| 6,580,356 | B1 | 6/2003 | Alt et al. ................... 340/5.8 |
| 6,609,198 | B1 * | 8/2003 | Wood et al. ............... 713/155 |
| 6,618,806 | B1 | 9/2003 | Brown et al. |
| 6,691,232 | B1 | 2/2004 | Wood et al. |
| 6,711,681 | B1 | 3/2004 | Al-Salqan et al. |
| 6,910,131 | B1 | 6/2005 | Yamada et al. |
| 6,961,849 | B1 * | 11/2005 | Davis et al. .............. 713/167 |
| 6,990,588 | B1 | 1/2006 | Yasukura |
| 7,191,466 | B1 * | 3/2007 | Hamid et al. .................. 726/3 |
| 2002/0016774 | A1 * | 2/2002 | Pendlebury ................. 705/51 |
| 2003/0097593 | A1 | 5/2003 | Sawa et al. .................... 726/4 |

FOREIGN PATENT DOCUMENTS

| | | |
|---|---|---|
| EP | 01085424 | 3/2001 |
| EP | 1176489 | 1/2002 |
| EP | 1 326 156 | 7/2003 |
| EP | 1603003 | 12/2005 |
| GB | 2 329 499 | 3/1993 |
| GB | 2 342 744 | 4/2000 |
| JP | 11338826 | 12/1999 |
| WO | WO 9514265 A1 * | 5/1995 |
| WO | WO 99/50734 | 10/1999 |
| WO | WO 01/65375 | 9/2001 |
| WO | WO 01/82190 | 11/2001 |
| WO | WO 03/062969 | 7/2003 |

OTHER PUBLICATIONS

C.B. Shelman, "Fingerprint Classification—Theory and Application" Proc. 76 Carnahan Conference on Electronic Crime Countermeasures, 1976.

Feri Pernus, Stanko Kovacic, and Ludvik Gyergyek, "Minutaie Based Fingerprint Registration" IEEE Pattern Recognition, pp. 1380, 1980.

J.A. Ratkovic, F.W. Blackwell, and H.H. Bailey, "Concepts for a Next Generation Automated Fingerprint System" Proc. 78 Carahan Conference on Electronic Crime Countermeasures, 1978.

K. Millard, "An Approach to the Automatic Retrieval of Latent Fingerprints" Proc. 75 Carahan Conference on Electronic Crime Countermensures, 1975.

Moayer and K.S. Fu, "A Syntactic Approach to Fingerprint Pattern Recognition" Memo Np. 73-18, Purdue University, School of Electronic Engineering. 1973.

Wegstein, An Automated Fingerprint Identification System, NBS special publication, U.S. Department of Commerce/National Bureau of Standards, ISSN 0083-1883; No. 500-89, 1982.

Moenssens, Andre A., Fingerprint Techniques, Chilton Book Co., 1971.

Wegstein and J.F. Rafferty, The LX39 Latent Fingerprint Matcher, NBS special publication, U.S. Department of Commerce/National Bureau of Standards; No. 500-36, 1978.

Harvey, Mike. "Why veins could replace fingerprints and retinas as most secure form of ID." *Times Online* Nov. 11, 2008 <http://technology.timesonline.co.uk/tol/news/tech_and_web/articles5129384.ece>.

Yesberg, J.D. et al. "Quantitative Authentication and Vouching", *Computers & Security*, Elsevier Science Publishers. Amsterdam, NL, vol. 15, No. 7, Jan. 1, 1996, pp. 633-645.

European Patent Office, Extended European Search Report, European Patent Application 10185106.1, applicant Activcard Ireland Limited et al., Mar. 25, 2011.

Non-Final Office Action for U.S. Appl. No. 10/847,884; Mailed on May 21, 2007; 21 pages.

Non-Final Office Action for U.S. Appl. No. 10/847,884; Mailed on Oct. 30, 2007; 25 pages.

Final Office Action for U.S. Appl. No. 10/847,884; Mailed on Feb. 19, 2008; 24 pages.

Non-Final Office Action for U.S. Appl. No. 10/847,884; Mailed on Jul. 31, 2008; 25 pages.

Non-Final Office Action for U.S. Appl. No. 10/847,884; Mailed on Dec. 18, 2008; 14 pages.

Non-Final Office Action for U.S. Appl. No. 10/847,884; Mailed on Jul. 6, 2009; 17 pages.

Final Office Action for U.S. Appl. No. 10/847,884; Mailed on Jan. 20, 2010; 20 pages.

Non-Final Office Action for U.S. Appl. No. 10/847,884; Mailed on Aug. 18, 2010; 17 pages.

Final Office Action for U.S. Appl. No. 10/847,884; Mailed on Feb. 3, 2011; 26 pages.

European Search Report for EP1176489; Mailed on Feb. 3, 2005; 3 pages.

Examination Report for EP1176489; Mailed on Jun. 27, 2007; 4 pages.

European Search Report for EP1603003; Mailed on Oct. 10, 2005; 3 pages.

Examination Report for EP1603003; Mailed on Apr. 19, 2007; 5 pages.

Decision to Refuse for EP1176489; Mailed on Jan. 12, 2011; 9 pages.
EPO Communication for EP1176489; Mailed on Feb. 17, 2006; 5 pages.

* cited by examiner

Work

Home

Away

FLEXIBLE METHOD OF USER AUTHENTICATION

CROSS-REFERENCE TO RELATED APPLICATIONS

This application is a continuation of and claims priority to U.S. patent application Ser. No. 09/625,548, filed Jun. 25, 2000, now U.S. Pat. No. 7,137,008, which is hereby incorporated by reference in its entirety.

FIELD OF THE INVENTION

This invention relates generally to authorisation of individuals and more particularly relates to a method of authorising individuals based on an available authorisation method.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e. the combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords that are relatively insecure. As such, many systems protected by passwords are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterisation is well known and can involve many aspects of fingerprint analysis. The analysis of fingerprints is discussed in the following references, which are hereby incorporated by reference:

Xiao Qinghan and Bian Zhaoqi: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, *An Automated Fingerprint Identification System*, NBS special publication, U.S. Department of Commerce/National Bureau of Standards, ISSN 0083-1883; no. 500-89, 1982;

Moenssens, Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500-36, 1978.

Though biometric authentication is a secure means of identifying a user, it has not penetrated the marketplace sufficiently to be on most desktops. Further, since most forms of biometric authentication require specialised hardware, market penetration is slow and requires both acceptance of the new hardware and a pressing need.

Typical uses of user authentication include system access, user identification, and access to a secure key database. Often a secure key database is encrypted with a key that is accessible through user authentication or identification.

Key management systems are well known. One such system, by Entrust® Technologies Limited is currently commercially available. Unfortunately, current key management systems are designed for installation on a single computer for use with a single fixed user authorisation method and for portability between computers having a same configuration. As such, implementation of enhanced security through installation of biometric input devices is costly and greatly limits portability of key databases. Password based protection of key databases is undesirable because of the inherent insecure nature of most user selected passwords.

For example, when using Entrust® software to protect a key database, the database is portable on a smart card or on a floppy disk. The portable key database is a duplicate of the existing key database. User authentication for the portable key database is identical to that of the original key database. The implications of this are insignificant when password user authentication is employed; however, when biometric user authentication such as retinal scanning or fingerprint identification are used, the appropriate biometric identification system is required at each location wherein the portable key database is used. Unfortunately, this is often not the case. In order to avoid this problem, organisations employ password access throughout and thereby reduce overall security to facilitate portability.

Alternatively, members of an organisation are not permitted to travel with portable key databases and thereby have reduced mobility and are capable of performing fewer tasks while outside the office. This effectively counters many of the benefits available in the information age.

In the past, a system was provided with a single available security system. Typically, prior art systems require a password. Alternatively, a system could require a password and a biometric, or another predetermined combination of user authorisation information. Unfortunately, passwords are inherently insecure. Further, because of the limited number of workstations equipped with biometric scanners and so forth, it is difficult to implement a system secured with biometrics. It would be advantageous to provide a method of user authorisation that is flexible enough to work on different workstations and to accommodate user needs of different users and at different workstations.

Another known system includes a key server. A key server is a single system that provides keys to individuals upon identification or authorisation. Such a system is useful in large organisations since it permits changing of system access codes without requiring every user to provide their personal key data storage device. Because of the extreme problems associated with losing secure keys, it is essential that a key server be backed up appropriately. Further, it is necessary that the server be available at all times. This is achieved through duplication of servers. Unfortunately, key servers are costly and this makes their implementation problematic in some instances. For example, a company performing a trial of a new user access system such as a fingerprint identification system often purchases and installs only a handful of "test" workstations. Thus, to try out fifty (50) fingerprint scanners with a key server configuration requires two robust key servers having full backup capabilities, a main key server and a duplicate key server, and 50 fingerprint imagers. Since a fingerprint imager is likely to cost less than 10% of the cost of the servers, the additional cost is extremely undesirable. Eliminating a need for a duplicate key server would be highly advantageous.

OBJECT OF THE INVENTION

In an attempt to overcome these and other limitations of the prior art, it is an object of this invention to provide a method of automatically determining available user authentication methods and allowing users to access a system using available methods.

It is a further object of the invention to provide a method of storing security information with each of several authorisation methods, the information optionally being different for each method.

SUMMARY OF THE INVENTION

In accordance with the invention there is provided a method of authorising a user in communication with a workstation comprising the steps of: automatically determining at least an available user information entry device in communication with the workstation; determining user authorisation methods each requiring data only from available user information entry devices from a plurality of user authorisation methods; providing user authorisation information in accordance with one of the determined user authorisation methods; and, registering the user authorisation information provided against stored data to perform at least one of identifying and authorising the user.

In accordance with the invention there is also provided a method of authorising a user in communication with a workstation comprising the steps of: providing a plurality of supported user authorisation methods and associated security levels for each user authorisation method; providing user authorisation information to the workstation; determining from the plurality of supported user authorisation methods an authorisation method requiring data only from the provided user authorisation information; and, registering the user authorisation information provided against stored data to perform at least one of identifying and authorising the user with the associated level of security.

In accordance with the invention there is further provided a method of authorising a user in communication with a workstation comprising the steps of: providing a plurality of user authorisation methods, some user authorisation methods requiring user authorisation information from more than one data input device; providing user authorisation information; registering the provided user authorisation information against data stored in a database of user authorisation data; when the data matches the stored data within predetermined limits, determining a security level for the individual in dependence upon the provided user authorisation information and the plurality of user authorisation methods; and, authorising user access within limits based upon determined security level.

Preferably, the at least an available user information entry device includes a plurality of available user information entry devices.

It is an advantage of the present invention that a user can gain access to a system using any of a number of user authorisation methods some of which may be available on some workstations and not at others.

It is a further advantage of some embodiments of the invention that convenient user authentication methods are usable unless a higher level of security is required.

BRIEF DESCRIPTION OF THE DRAWINGS

An exemplary embodiment of the invention will now be described in conjunction with the attached drawings, in which.

DETAILED DESCRIPTION

The invention is described with respect to passwords, tokens, and biometric verification in the form of fingerprint registration. The method of this invention is applicable to other verification processes as is evident to those of skill in the art.

One of the many problems with a fingerprint biometric is that a special contact-imaging device is required to image a fingerprint. Today, many systems and, in particular, many personal computers are not equipped with a contact imaging device. It is well known to outfit a network of workstations with biometric imaging devices in order to overcome these limitations. Unfortunately, for those who travel on business and need access to sensitive data in the form of network data or encrypted email, such a solution is not always possible and convenient. Another known solution is to travel with a portable contact-imaging device. Unfortunately, installation of special software and additional hardware expense is commonly required thereby rendering such an approach impractical. Also, many different biometric identification techniques are now known and available. It is impractical to install hardware and software in order to switch between verification methods. According to the invention, a method is proposed for providing a flexible authentication process that maintains security of an overall system without causing undue inconvenience or limitations.

Figure 1:
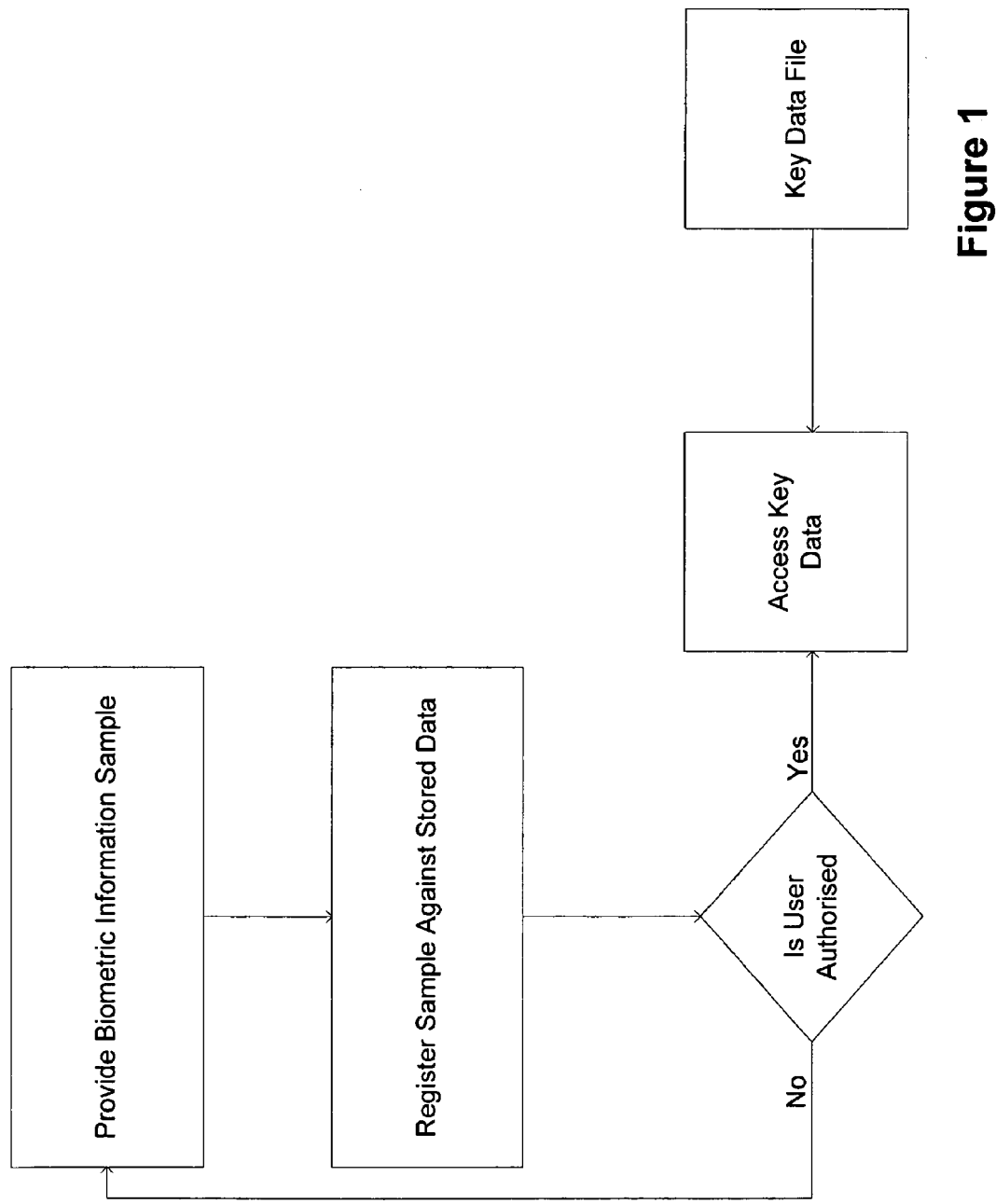
FIG. 1 is a flow diagram of a prior art method of accessing secured data.

Referring to FIG. 1, a simplified flow diagram of a prior art method of accessing secured data is shown for use in a network comprising a plurality of computers each having a biometric imaging means. A key data file comprises a cryptographic key, which is secured using a biometric authentication method. According to the method, biometric authentication is required to access the cryptographic key. For example, the cryptographic key is encrypted using a key secured by the biometric information. Upon presentation of appropriate biometric information, the secured cryptographic key is accessed, the cryptographic key is decrypted, and the decrypted cryptographic key is used to encrypt or decrypt data files. The method of accessing the cryptographic key is predetermined and is unchanging in nature. Of course, other methods of securing cryptographic keys using biometric authentication are also applicable. For example, secure key locations may be determined by the user authentication process. Thus, if a key is secured using a fingerprint, access is through provision and analysis of a fingerprint and it is necessary to outfit each system wherein the user may require access to the key with appropriate fingerprint imaging hardware. Similarly, when the key is secured with a token, such as a smart card, the token interface must be installed on each system wherein the user may require access to the key. Presently, it is common to secure the key with a password since almost all systems are equipped with a keyboard. Unfortunately, passwords suffer from many security related disadvantages.

For convenience, key data files are typically transportable in the form of an encrypted data file containing the key data and security data necessary to access the encrypted data file. Unfortunately, each other computer system to which the key data file is transported must support a same authentication process in order to provide access to the key data file. For example, when the second computer has no biometric information input device, the user authorisation method for accessing the secured key can not be executed and the secured key is not accessible. Without the secured key, the encrypted cryptographic key data can not be accessed when desired. Alternatively, a method of extracting the keys from the key data file absent user authentication is necessary. Such a method is not desirable since it greatly reduces security. This exemplary problem is analogous to problems in network access, file access, network security, document authentication, and so forth.

Figure 2:
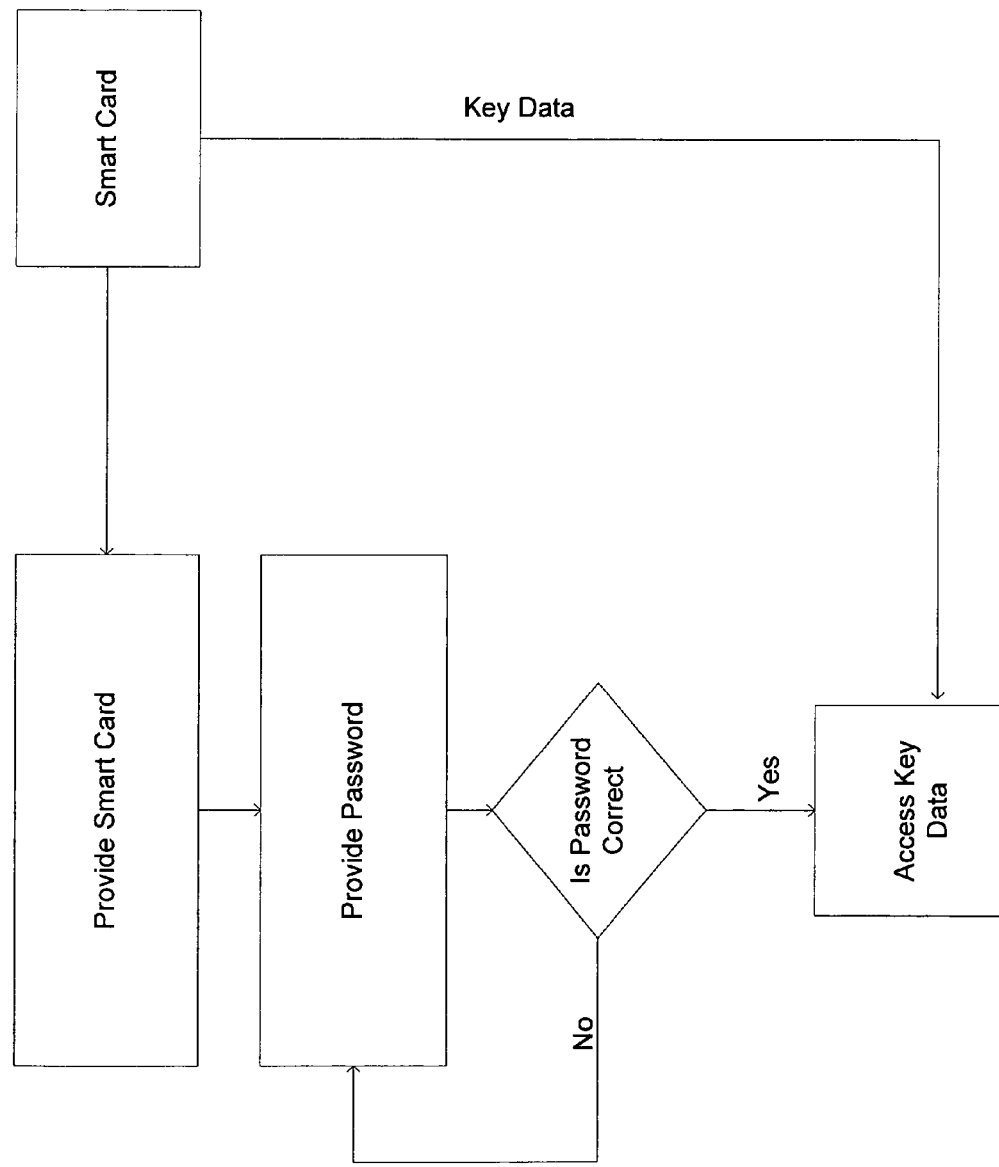
FIG. 2 is a flow diagram of a prior art method of accessing secured data.

Referring to FIG. 2, a prior art method of accessing secured data using a smart card based verification process but absent a biometric verification process is shown. Here, a password or card based user authentication is employed. A smart card having a key data file stored therein is placed into a smart card reader. A user is prompted for user authentication in the form of a password. Once the password is verified, access to the cryptographic key is permitted and encrypted data files are accessible. One such method is to employ the password or a predetermined portion thereof as a key for encrypting the cryptographic key. Another such method involves providing access to a secured key upon verification of the password and using the secured key to access the cryptographic key. As is evident to those of skill in the art, conventional key data files can not be transferred from a system employing a method, such as that of FIG. 1, to a system employing a different method, such as that of FIG. 2. Because of this, prior art systems are used in a less than optimally secure fashion wherein a single user authentication system in the form of passwords is used. Alternatively, transportability and remote access is reduced where biometric user authentication is conducted. Further alternatively, expenses are greatly increased in providing homogenous hardware and software base for all systems within an organisation.

Figure 3:
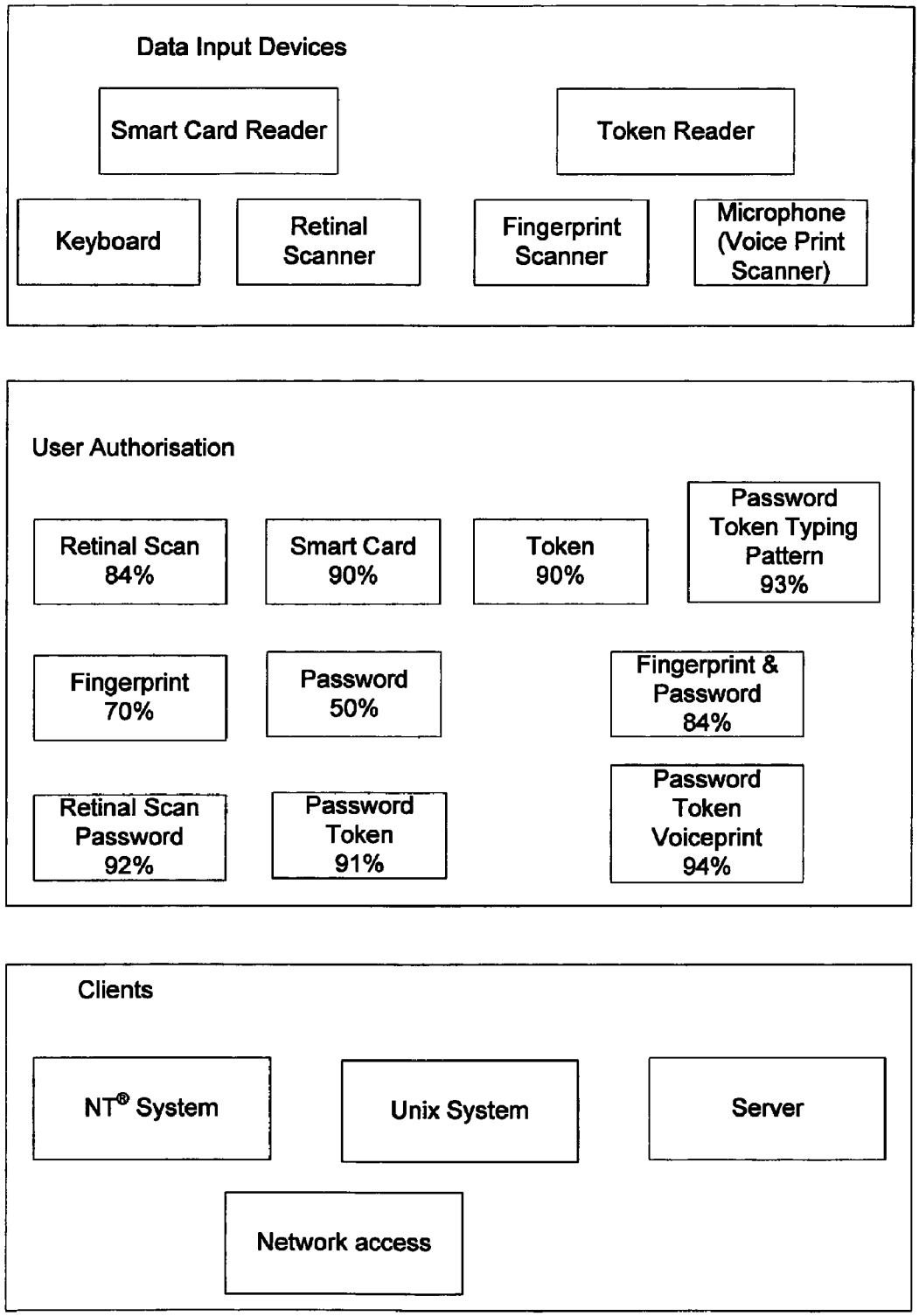
FIG. 3 is a block diagram of an exemplary system for user authorisation according to the invention.

Referring to FIG. 3 and in accordance with the invention, a simplified block diagram of a system for providing flexible user authorisation is shown. The system is provided with a user authorisation block, a plurality of clients and a plurality of data input devices. Typically, each data input device is capable of providing data for use in user authentication and, each client is capable of being accessed by at least some users. The user authorisation block includes several user authorisation sub-blocks. Each sub-block depends on a set of user data provided from one or more data input devices for performing a user authentication. Further, each sub-block relates to security data associated with the sub-block in the form of an estimated security level. A discussion of related security data is presented below.

Data input devices include biometric input devices in the form of a fingerprint imager in the form of a contact imager, a retinal scanner, and a microphone; a keyboard; a smart card reader; and a token reader. Other data entry devices including other biometric information gathering devices are also well-suited to use with the present invention. A careful review of the data input devices is useful in establishing advantages and/or disadvantages to each.

Biometric data input devices such as the retinal scanner, the fingerprint imager and the microphone are very convenient devices. A user need provide nothing other than portions of their person. Thus it is impossible to forget a code or an access card. That said, once a method of breaching security with a biometric input device is found, it is difficult if not impossible to correct because biometrics do not change. Also, due to health related issues or wear, biometrics are not always usable. For example, a scratchy throat results in a voice that may render a voice print unintelligible to a recognition system. That said, a biometric is generally considered to be a reliable data source for user identification.

The keyboard is the most common data input device for user authorisation. The keyboard is useful for entering codes and passwords. It is also known to use keystroke timing and typing speeds to identify individuals. These are known identification techniques. Unfortunately, passwords are inherently insecure and typing speed changes over time and is difficult to use in isolation to establish identification accurately.

Smart card and token readers allow for the use of access cards, analogous to keys, to provide user authorisation data. Like all access cards, these cards are prone to loss, theft and are often forgotten. It is advantageous to limit the effects of forgetting an access card without compromising system security. Since both tokens and smart cards are likely stored in a user's wallet, there is little security enhancement in using both together. It is also advantageous to limit the risk of a stolen wallet resulting in a security breach.

The user authorisation block shows a number of authentication methods alone or in combination. A quick review shows that a token and smart card are used interchangeably with the exemplary system. So are a fingerprint-password combination and a retinal scan. A Retinal scan-password combination and a fingerprint-smart card combination also have equivalent security levels. Thus, any of a number of user authorisation methods are available some of which are interchangeable—provide same security levels—for user authentication purposes. Of course, this need not be so. Each user authorisation method may have a distinct security level.

When a user forgets their smart card, they can still access the system using the retinal scanner and password and retain similar access privileges. Use of the retinal scanner may be less convenient, but is likely more convenient than returning home to retrieve the forgotten access card. Further, it is far more secure than having a user logged onto the system using someone else's access card or biometric information. Also, when the user is out of the office, they can still access any system using a password and token or a password-token-voiceprint. These require commonly available data input devices. Unfortunately, these may be difficult to use in some environments such as a noisy environment for the voice-print and so forth.

Related security data is typically implemented based on individuals and authentication method. Some users will have access to certain clients only when authenticated with an authentication sub-block believed to provide sufficient security for that client.

Alternatively, for each sub-block an estimated security level is provided and for each client a desired security level is provided. When a user is authorised with a particular sub-block they have access to resources requiring less security than that estimated as provided by the particular sub-block.

Further alternatively, users have access restrictions and there is also a further global access restriction such as estimated security levels or enumeration of sub-blocks and whether or not each is sufficient to allow access.

An exemplary use is now described with reference to the system of FIG. 3. and referring to the user list and other data of Table 1. A company has a key server for providing encryption keys to individuals for securing their email. Also, the corporation has an accounting system, a network (Novell), Windows NT Servers, Unix servers, and access to systems of contractors and contracts. For example, a military database is accessible for information relating to a research project being conducted for the military and a university database is accessible for data relating to a university project being conducted for the company.

| USER | General System | Personal Data | Accounting Data | Military Database | University Database |
|---|---|---|---|---|---|
| User A | 60% | 84% | 90% | 93% | 40% |
| User B | 60% | 90% | 90% | N/A | 40% |
| User C | 60% | 93% | N/A | 93% | 40% |

A first user A arrives at the office in the morning. A has forgotten their identification card in the form of a smart card at home. Because of this, A identifies themself using a password and a biometric. The selected identification type is rated at 84% security level. A quick review of system security levels establishes that the individual is not capable of accessing highly secure information such as personnel files, corporate accounting records and so forth. They are, however, provided access to the general corporate data and the data network.

In the above example, the military database requires at least 93% security and therefore, the user authorisation block will not provide data to the military database to access it. Thus, when the user is working on a military related project, it is essential that they are provided with adequate methods of data entry or, alternatively, that they remember their access card.

Because of the flexibility of the system, many problems with prior art identification systems are obviated. For example, if employee A has been doing construction work, his hands may be damaged such that fingerprint data is not reliable. As such, he can select another form of authorisation data input for personal identification. Other examples include having a sore throat, forgetting an access card, and so forth. Thus the inherent flexibility of the system is extremely advantageous.

Figure 4:
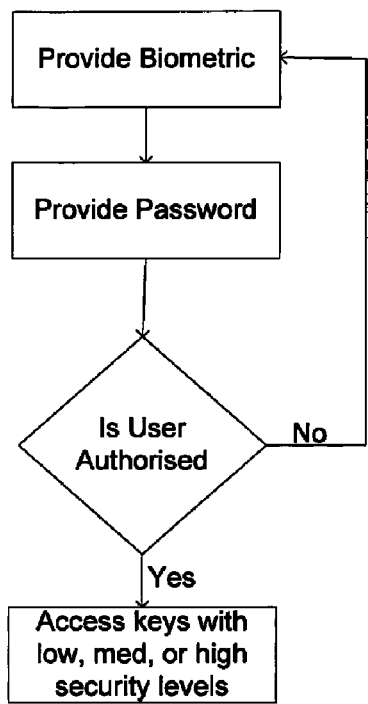
FIG. 4 is a simplified flow diagram of a method of accessing from a plurality of different locations key data stored within a portable medium.
Figure 4:
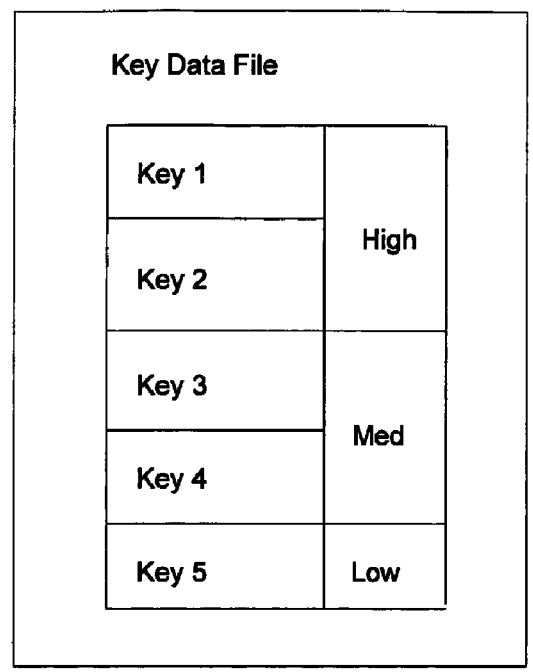
Figure 4:
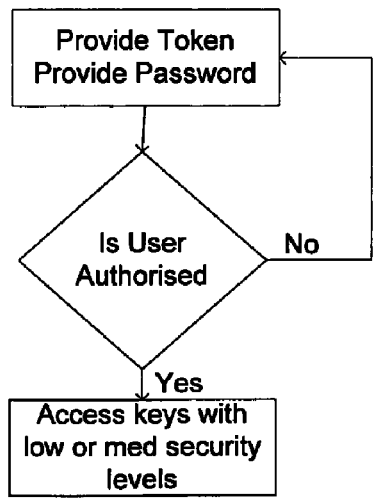
Figure 4:
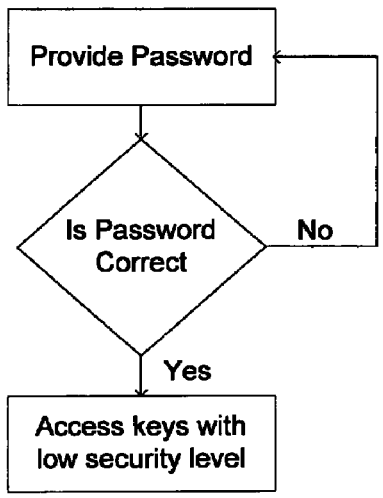

Referring to FIG. 4, a simplified flow diagram of a method of porting a key data file between different locations is provided. According to the diagram, a user is provided with a plurality of keys stored within a portable key data file and accessible upon user authorisation. At work, the user selects a user identification method in the form of biometric, token, and password. The user then identifies himself using his bimometric data, his token, and a corresponding password. The combination is sufficient to provide the user with high level of security. As such, the user has access to data secured with key 1 and key 2. Typically, the user has access to all the keys in the key database when authorised with a highest level of security. Of course, this need not be so. At home, the same user has access to the key data file. Since, as shown, the user authorises himself with a password and a token, only keys with a medium security level or lower are accessible. Thus, for example, personnel files and accounting files as well as secure confidential files are inaccessible. Other work files and personal files are accessible. When the user is away, he authorises himself with a password only and, as such, only has access to the key having a low security level. Typically such a key will secure marketing data, already published data, unsecure data and an individuals own personal files.

Of course, when the individual is at a workstation having a token reader or a biometric input device, access to key 1 and key 2 is available as long as the access methods required are supported. This increases flexibility and, thereby improves overall usability of the security system.

According to a further embodiment of the invention, a method is provided for retrofitting existing security systems with the present invention in a novel fashion that increases overall security of existing systems. As noted above, passwords are inherently insecure because secure passwords cannot be easily remembered and insecure passwords are not secure. Many people use their children's names or dog's name for a password. Others use their own names or phone numbers. These are all easily "cracked" by hackers. A secure password is a random string of numbers and letters and characters some visible and some not. For example, "argH" CTRL (p) "Umm!23." is a difficult password to crack. It is also very difficult to remember.

Figure 5:
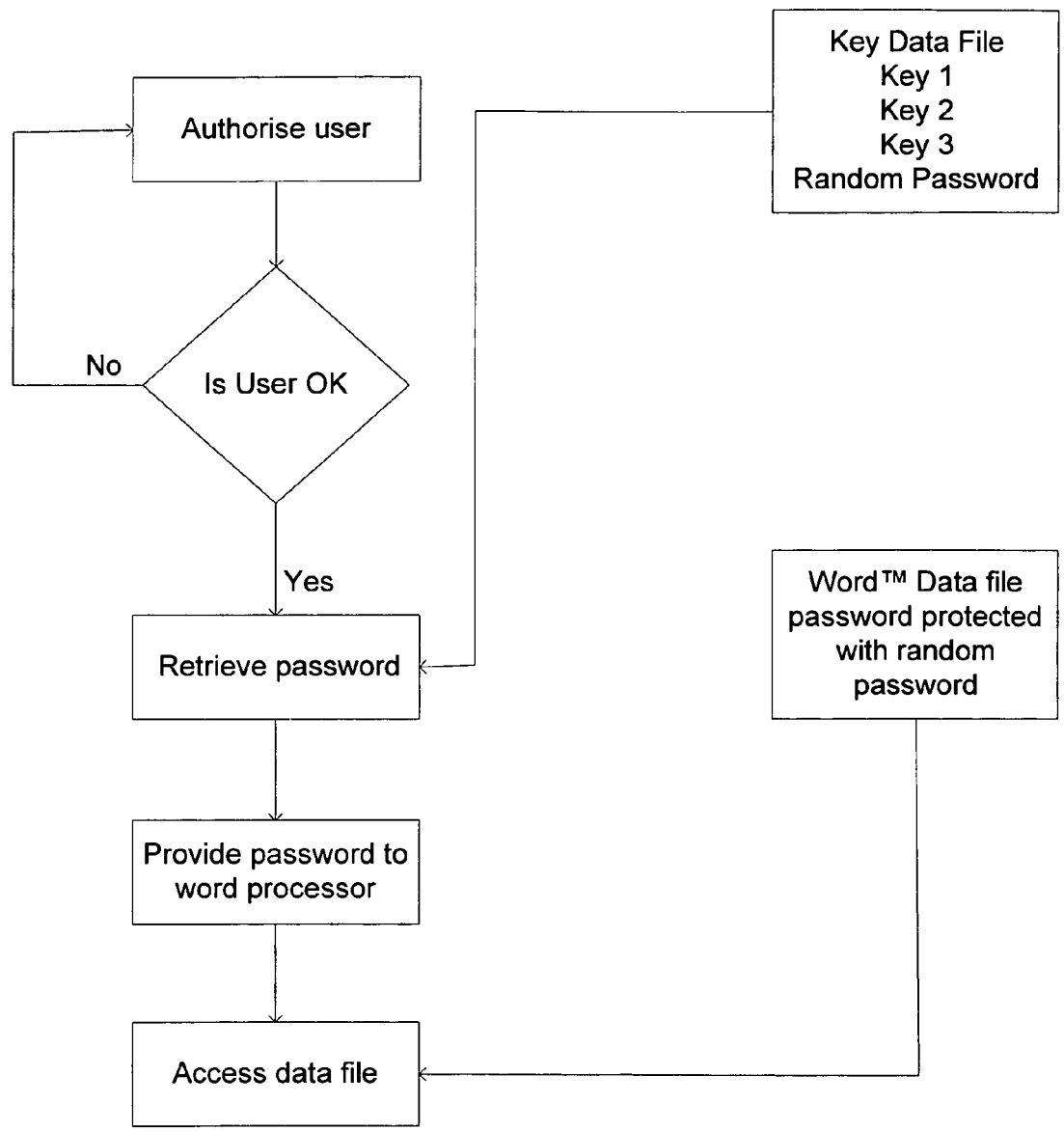
FIG. 5 is a simplified flow diagram of a method of providing upon user authorisation password data unknown to a user to a password security system for accessing a file or an application.

Referring to FIG. 5 and in order to overcome these difficulties, the invention provides a method of storing the secure password in a secure storage location such as a key database on a key escrow server or a key database on a smart card. Preferably, the password is unknown to the user. To access the password, the user authorises themselves according to the present invention. When the authorisation is of a sufficiently high security level to provide access to the password, the password is decoded and transmitted to the appropriate recipient authorisation process. The result is that a single user authorisation procedure is useful on a plurality of different systems even when those systems do not support the authorisation procedure directly.

To highlight the advantages of the above embodiment, an example follows with reference to FIG. 5. A Word® document can be stored "password protected." Often this is used to secure a document from unauthorised access. The passwords chosen are often insufficient to provide any real security. In order to provide significant security, a user selects password protect document and authorises themselves to provide the password to Word®. The document is stored password protected. The user does not need to know the password, which may be generated at random. When the user goes to access the document, the authorisation process is repeated and the password is provided to Word® to access the document. This also alleviates the problem with incorrect entry of password data, people looking over the shoulder of an employee as they enter their password and so forth.

A simple method of implementing the invention is to record a user's password entry during use and to play it back when the user is authorised. Though this is advantageous since it is more convenient than present user authorisation methods, it does not use the full potential of the present invention wherein the password is unknown to the users of the system. Because the passwords can be unknown to the users of the system and can be arbitrarily long and complicated, the method allows for conversion of existing password protected systems into more secure systems without causing undue user inconvenience, undue expense, and without requiring replacement of software applications with new software applications.

Figure 6:
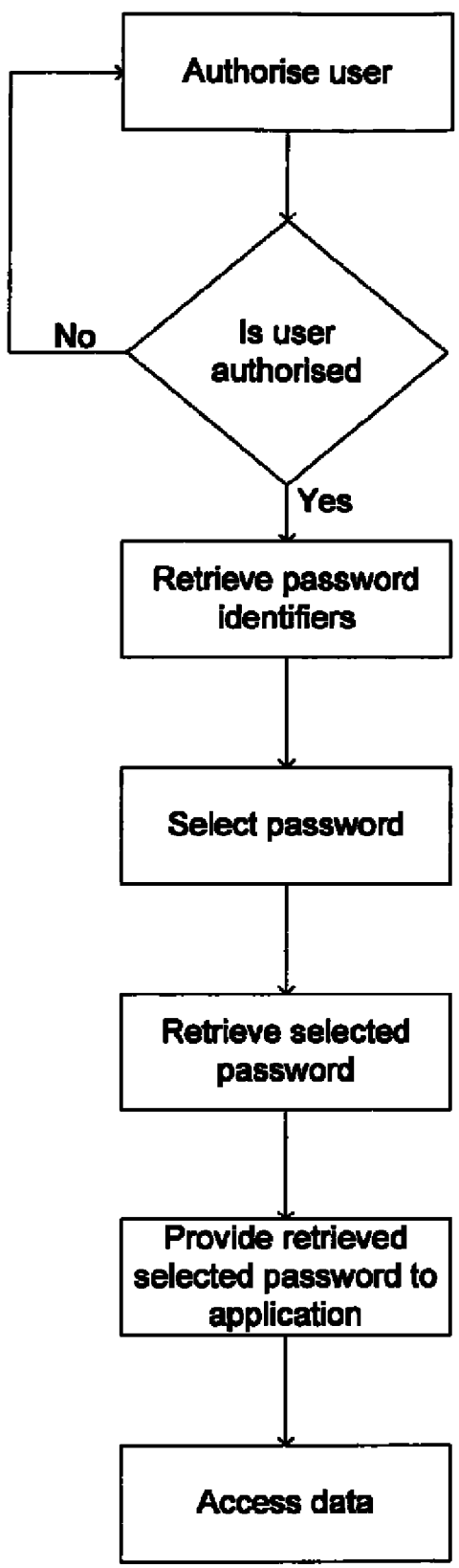
FIG. 6 is a simplified flow diagram of a method of providing one of a plurality of passwords to a password subsystem based upon a security level of a user authorisation method; and, FIG. 7 is a simplified flow diagram of a method of changing a password stored within a key data file and for securing a plurality of files or applications.

The system is expandable. Instead of a single password for an application or for all applications, users could be prompted to select the password they wish to access as shown in FIG. 6. This allows a user to secure some files with personal information using a first password and others using a company provided password. It also allows for a hierarchy of security levels each having a password.

Figure 7:
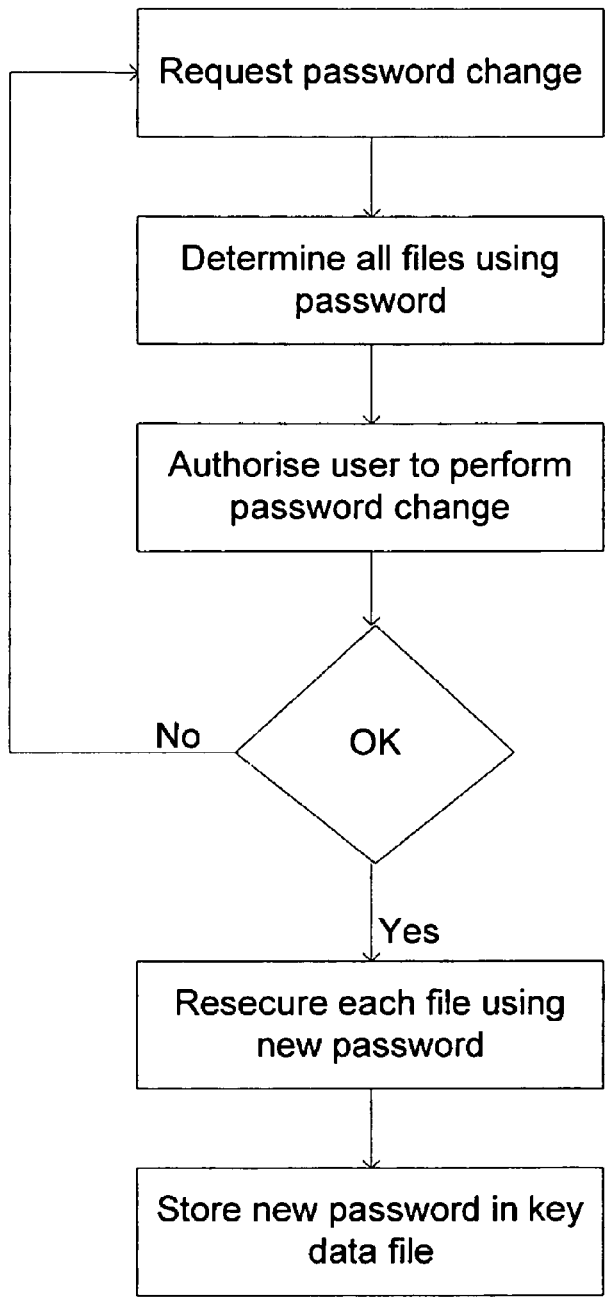

Referring to FIG. 7, by maintaining a list of where each password is used, the system can automatically change the password associated with each file, system and the passwords stored in the key database, when one is used. This allows for periodic updates of passwords to enhance security. It also allows for automatic update of passwords at intervals and for manual updates of passwords when a security breach is identified.

A password to be changed is identified. For example, the accounting password may have expired and may require updating. The user requesting a change of password is authorised. This involves prompting the user for information and comparing the received information against previously stored information to identify the user. Once authorised, a new password is automatically generated. Each data file secured with the password to be changed is identified, and is resecured using the newly generated password. The password to be changed is then archived or, optionally, destroyed. The generated password is stored in the key data file for future access. Optionally, instead of automatically generating the password, the user is prompted to provide a password. This is, in some ways less secure but may be desirable.

Numerous other embodiments may be envisaged without departing from the spirit and scope of the invention.

What is claimed is:

1. A method of authorizing a user to selectively access stored files, the method comprising:
   authorizing a user to access a system having files stored thereon, wherein authorizing the user comprises—
      determining two or more available user information entry devices from a plurality of different user information entry devices in communication with the system, wherein each of the different user information entry devices is associated with a corresponding distinct security level;
      determining an authorization method from a plurality of different authorization methods, wherein the plurality of different authorization methods require data from the two or more corresponding available user information entry devices;
      receiving user authorization information from the two or more available user information entry devices and combining the corresponding distinct security levels into an authorization level for the authorization method;
      selecting stored data corresponding to the level of authorization; and
      registering the received user authorization information against the selected stored data to perform at least one of identifying and authorizing the user at the authorization level;
   upon authorization of the user, retrieving a plurality of password identifiers, individual password identifiers being associated with a password, and individual passwords providing access to a file;

receiving an indication of a selected password identifier; and providing a password associated with the selected password identifier to an application to access the file.

2. The method of claim 1, further comprising:
storing the plurality of passwords identifiers in a secure storage location.

3. The method of claim 2, further comprising:
retrieving the password associated with the selected password identifier from the secure storage location.

4. The method of claim 2, wherein storing the plurality of password identifiers in a secure storage location comprises storing the plurality of password identifiers in one or more of a key escrow server and a smart card.

5. The method of claim 1, wherein receiving the indication of a selected password identifier comprises receiving the indication of a selected password identifier associated with a password that the user is unaware of.

6. The method of claim 1, wherein receiving the indication of a selected password identifier comprises receiving the indication of a selected password identifier associated with a password that is designated by the user.

7. The method of claim 1, further comprising:
providing the user with access to the file.

8. The method of claim 1, wherein receiving the indication of a selected password identifier comprises receiving the indication of a selected password identifier from the user for a file.

9. The method of claim 1, wherein receiving the indication of a selected password identifier comprises receiving the indication of a selected password identifier associated with respective passwords that provide user access to respective sets of files in the system.

10. The method of claim 1, wherein receiving the indication of a selected password identifier comprises receiving the indication of a selected password identifier associated with respective passwords that provide access to respective security levels within the system.

11. A method of updating a password associated with a plurality of files, the method comprising:
receiving a request from a user to change the password;
authorizing the user by—
determining at least two available input devices from a plurality of different input devices in communication with a system, wherein the different input devices are associated with corresponding different degrees of security;
determining an authorization method from a plurality of different authorization methods, wherein the plurality of different authorization methods require data from the at least two corresponding available input devices;
combining the different degrees of security to obtain an authorization level for the determined authorization method having an associated security level sufficient for accessing the password; and
authorizing the user according to the determined authorization method with data received from the determined at least two available input devices;
determining the plurality of files associated with the password;
receiving an indication of a new password; and
securing the plurality of files with the new password.

12. The method of claim 11, further comprising:
storing the new password in a key database.

13. The method of claim 11, wherein receiving the request from the user comprises receiving a first request to change the password, and wherein the method further comprises receiving a second request to change the password, wherein the second request is an automatic password change request at a predetermined time interval.

14. The method of claim 11, wherein receiving the indication of the new password comprises automatically generating the new password.

15. The method of claim 11, wherein authorizing the user requesting the password change comprises:
prompting the user for identification information; and
comparing the identification information against previously stored information.

16. The method of claim 11, further comprising:
archiving the password upon receiving the indication of the new password.

17. The method of claim 11, further comprising:
destroying the password upon receiving the indication of the new password.

18. The method of claim 11, wherein receiving an indication of a new password comprises receiving the new password from the authorized user.

19. The method of claim 11 wherein:
receiving the request to change the password comprises receiving the request to change a first password and a second password;
determining the plurality of files comprises determining a plurality of first files associated with the first password and a plurality of second files associated with the second password;
receiving an indication of a new password comprises receiving an indication of a first new password and a second new password; and
securing the plurality of files comprises securing individual first files with the first new password and individual second files with the second new password.

20. The method of claim 19 wherein the first password corresponds to a higher security level than the second password.

21. The method of claim 11 wherein the authorization methods associated with the corresponding input devices comprise at least one of the following: a retinal scan, a smart card authorization, a token authorization, a password token typing pattern, a fingerprint, a password, a fingerprint and a password, a retinal scan and a password, a password token, and a password token voiceprint.

22. The method of claim 11 wherein determining at least one available input device comprises determining at least one available input device from at least one of the following input devices: a smart card reader, a keyboard, a retinal scanner, a token reader, a fingerprint scanner, and a microphone/voice print scanner.

23. A method of updating a password associated with a plurality of files, the method comprising:
receiving a request from a user to change the password;
authorizing the user by—
determining two or more available input devices from a plurality of different input devices in communication with a system, wherein the different input devices are associated with corresponding different degrees of security;
determining an authorization method from a plurality of different authorization methods, wherein the plurality of different authorization methods require data from a two or more corresponding available user input devices, the determined authorization method having a security level calculated by combining the degrees of security from the two or more available input devices, and wherein the determined two or more available input devices and corresponding authorization method have an associated security level sufficient for accessing the password; and authorizing the user according to the determined authorization method with data received from the determined two or more available input devices;

determining the plurality of files associated with the password;

receiving an indication of a new password;

securing the plurality of files with the new password;

identifying a security breach; and receiving an automatic password change request upon identification of the security breach.

24. The method of claim 23 wherein:

receiving the automatic password change request comprises receiving the automatic password change request to change the password to a password associated with a higher security level.

* * * * *

UNITED STATES PATENT AND TRADEMARK OFFICE
CERTIFICATE OF CORRECTION

PATENT NO. : 8,296,570 B2
APPLICATION NO. : 11/508463
DATED : October 23, 2012
INVENTOR(S) : Hamid et al.

It is certified that error appears in the above-identified patent and that said Letters Patent is hereby corrected as shown below:

On the Title Page, in Item [56], under "OTHER PUBLICATIONS", in Column 1, Line 2, delete "Fingerprint"" and insert -- Fingerprint," --, therefor.

On Title Page 2, in Item [56], under "OTHER PUBLICATIONS", in Column 1, Lines 1-2, delete "Application"" and insert -- Application," --, therefor.

On Title Page 2, in Item [56], under "OTHER PUBLICATIONS", in Column 1, Line 4, delete ""Minutaie" and insert -- "Minutiae --, therefor.

On Title Page 2, in Item [56], under "OTHER PUBLICATIONS", in Column 1, Line 5, delete "Registration"" and insert -- Registration," --, therefor.

On Title Page 2, in Item [56], under "OTHER PUBLICATIONS", in Column 1, Line 8, delete "System" Proc. 78 Carahan" and insert -- System," Proc. 78 Carnahan --, therefor.

On Title Page 2, in Item [56], under "OTHER PUBLICATIONS", in Column 1, Lines 10-11, delete "Fingerprints" Proc. 75 Carahan" and insert -- Fingerprints," Proc. 75 Carnahan --, therefor.

On Title Page 2, in Item [56], under "OTHER PUBLICATIONS", in Column 1, Line 12, delete "Countermensures," and insert -- Countermeasures, --, therefor.

On Title Page 2, in Item [56], under "OTHER PUBLICATIONS", in Column 1, Line 14, delete "Recognition" Memo Np." and insert -- Recognition," Memo No. --, therefor.

On Title Page 2, in Item [56], under "OTHER PUBLICATIONS", in Column 1, Line 15, delete "Engineering." and insert -- Engineering, --, therefor.

On Title Page 2, in Item [56], under "OTHER PUBLICATIONS", in Column 2, Line 9, delete "Mike." and insert -- Mike, --, therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,296,570 B2

On Title Page 2, in Item [56], under "OTHER PUBLICATIONS", in Column 2, Line 10, delete "ID." Times Online Nov. 11, 2008" and insert -- ID," Times Online, Nov. 11, 2008, --, therefor.

On Title Page 2, in Item [56], under "OTHER PUBLICATIONS", in Column 2, Line 13, delete "al." and insert -- al., --, therefor.

On Title Page 2, in Item [56], under "OTHER PUBLICATIONS", in Column 2, Line 14, delete "Publishers." and insert -- Publishers, --, therefor.

In the Specifications

Column 1, Line 8, delete "Jun." and insert -- Jul. --, therefor.

Column 2, Line 35, delete "Zhaoqi: An" and insert -- Zhaoqi, "An --, therefor.

Column 2, Line 42, delete ""Minutaie" and insert -- "Minutiae --, therefor.

Column 2, Line 52, delete "Np." and insert -- No. --, therefor.

Column 8, Line 14, delete "FIG.3." and insert -- FIG.3 --, therefor.

Column 8, Line 64, delete "bimometric" and insert -- biometric --, therefor.

Column 9, Line 12, delete "individuals" and insert -- individual's --, therefor.

In the Claims

Column 10, Line 41, in Claim 1, delete "comprises-" and insert -- comprises: --, therefor.

Column 11, Line 42, in Claim 11, delete "by-" and insert -- by: --, therefor.

Column 12, Line 54, in Claim 23, delete "by-" and insert -- by: --, therefor.

UNITED STATES PATENT AND TRADEMARK OFFICE
CERTIFICATE OF CORRECTION

| | | |
|---|---|---|
| PATENT NO. | : 8,296,570 B2 | Page 1 of 1 |
| APPLICATION NO. | : 11/508463 | |
| DATED | : October 23, 2012 | |
| INVENTOR(S) | : Hamid et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1574 days.

Signed and Sealed this
Thirtieth Day of September, 2014

Michelle K. Lee
*Deputy Director of the United States Patent and Trademark Office*